(12) United States Patent
Oakley et al.

(10) Patent No.: US 8,630,382 B2
(45) Date of Patent: Jan. 14, 2014

(54) ASYNCHRONOUS DATA RECOVERY METHODS AND APPARATUS

(75) Inventors: John R. Oakley, Tempe, AZ (US); Uday Padmanabhan, Chandler, AZ (US); Samir J. Soni, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 952 days.

(21) Appl. No.: 12/413,101

(22) Filed: Mar. 27, 2009

(65) Prior Publication Data

US 2010/0246735 A1  Sep. 30, 2010

(51) Int. Cl.
*H04L 7/00* (2006.01)
*H04L 27/06* (2006.01)
*H03L 7/24* (2006.01)

(52) U.S. Cl.
USPC .......................... 375/355; 375/340; 331/47

(58) Field of Classification Search
USPC ........ 375/316, 340, 354, 355; 331/46, 47, 48, 331/55, 56
See application file for complete search history.

(56) References Cited

U.S. PATENT DOCUMENTS

| | | | |
|---|---|---|---|
| 3,623,074 A * | 11/1971 | Bailey | 375/340 |
| 4,385,396 A | 5/1983 | Norton | |
| 4,513,427 A | 4/1985 | Borriello et al. | |
| 5,164,966 A | 11/1992 | Hershberger | |
| 5,329,559 A | 7/1994 | Wong et al. | |
| 5,367,542 A | 11/1994 | Guo | |
| 5,491,729 A | 2/1996 | Co et al. | |
| 5,689,530 A | 11/1997 | Honaker, Jr. | |
| 5,864,250 A | 1/1999 | Deng | |
| 5,963,606 A | 10/1999 | Drost et al. | |
| 6,081,561 A * | 6/2000 | Julyan et al. | 375/340 |
| 6,122,335 A | 9/2000 | Colella et al. | |
| 6,166,572 A | 12/2000 | Yamaoka | |
| 6,211,741 B1 | 4/2001 | Dalmia | |
| 6,215,835 B1 | 4/2001 | Kyles | |
| 6,269,137 B1 | 7/2001 | Colella et al. | |
| 6,389,090 B2 | 5/2002 | Zortea et al. | |
| 6,526,109 B1 | 2/2003 | Chang et al. | |
| 6,611,219 B1 | 8/2003 | Lee et al. | |
| 6,847,789 B2 | 1/2005 | Savoj | |
| 6,901,126 B1 | 5/2005 | Gu | |
| 6,956,921 B1 | 10/2005 | Hansson | |
| 6,959,058 B2 | 10/2005 | Yoo et al. | |
| 2002/0085655 A1 * | 7/2002 | Johnson | 375/354 |
| 2002/0131530 A1 * | 9/2002 | Zhang | 375/340 |
| 2004/0015774 A1 * | 1/2004 | Sakai et al. | 714/797 |
| 2007/0230614 A1 * | 10/2007 | Walker et al. | 375/296 |
| 2010/0054382 A1 * | 3/2010 | Kinnerk et al. | 375/355 |
| 2010/0098150 A1 | 4/2010 | Soni et al. | |

* cited by examiner

*Primary Examiner* — Betsy Deppe
(74) *Attorney, Agent, or Firm* — Sherry W. Schumm (57) ABSTRACT

Embodiments of data recovery apparatus include oscillators, edge detection circuitry, and data storage. The oscillators generate data detection signals, which convey first series of pulses during time periods for which a serial bit stream conveys a logical 1, and second series of pulses during time periods for which the serial bit stream conveys a logical 0. The edge detection circuitry detects transition edges of the first and second series of pulses, and generates data storage signals that include first indications of detected transition edges in the first series of pulses and second indications of detected transition edges in the second series of pulses. In response to receiving a first indication, a logical 1 is written into an unmasked subset of data storage bit locations. In response to receiving a second indication, a logical 0 is written into the unmasked subset of bit locations.

20 Claims, 6 Drawing Sheets

ASYNCHRONOUS DATA RECOVERY METHODS AND APPARATUS

TECHNICAL FIELD

Embodiments of the inventive subject matter relate to data recovery, and more particularly, to methods and apparatus for data recovery in an asynchronous interface.

BACKGROUND

Traditional approaches for exchanging data over asynchronous interfaces (e.g., DigRF3G interfaces, serializer/deserializer (SerDes) interfaces, and universal serial bus (USB) interfaces) have employed data recovery methods, which generate multiple phases of an internal clock running at a higher rate than the bit rate (e.g., 4× or 8× the bit rate). Each of the multiple clock phases are used to over-sample preamble bits of a data frame. Based on a correlation phase selection algorithm, these interfaces select one of the multiple clock phases to be used in conjunction with sampling data bits in the data frame. These approaches depend on the generation of accurate distributed clock phases, which may be provided by digital dividers or delay lock loops (DLLs).

Unfortunately, in traditional interfaces that employ multiple clock phase generation, the effects of phase imbalance on performance of the interface may be difficult to quantify. Furthermore, such an interface may have relatively high power consumption, because the interface toggles at a rate that is at least twice the data rate, regardless of the data duty cycle. This relatively high power consumption may be compounded in an interface that employs DLLs, because such an interface may continue to generate unwanted phases, even after a phase is selected for the data recovery process. In addition, as these interfaces may employ sampling mechanisms that are highly dependent on phase relationship, data frame sizes typically also are limited.

The designs of data recovery methods for high-speed, asynchronous interfaces have become increasingly complex due to consumer-driven desires for higher supported bit rates. For example, DigRF4G interfaces may be required to support bit rates in excess of 2.5 gigabits/second, and new generations of SerDes interfaces may be required to support bit rates in excess of 1 gigabit/second. For such interfaces, implementing data recovery that depends on multiple clock phases and over-sampling of preamble bits would necessitate the generation of clock signals having rates that are multiples of the already high bit rates. For example, with 4× over-sampling (a typical minimum over-sampling rate), a DigRF4G interface may require the generation of clock signals of about 10 gigahertz (GHz) to implement over-sampling of the preamble bits. Generation of such high-speed clock signals would be a challenge using current technologies, and the increased interface complexity implemented to support the increasingly high bit rates may increase the time to market and/or generally increase the manufacturing costs for devices that include such interfaces.

Accordingly, methods and apparatus are desired for performing asynchronous data recovery, which may exclude the generation or use of multiple clock phases, and which particularly avoid the need to generate clock signals at rates that are multiples of proposed, high-speed bit rates (e.g., multiples of DigRF4G interface bit rates or new generation Ser/Des interface bit rates). Further, high-speed (e.g., 1 gigabit/second bit rates and higher) asynchronous data recovery apparatus are desired, which may include less complicated architectures (e.g., apparatus that exclude DLLs), when compared with traditional asynchronous data recovery apparatus. Further still, high-speed asynchronous data recovery apparatus are desired, which may consume less power in conjunction with performing asynchronous data recovery, when compared with traditional asynchronous data recovery apparatus.

DETAILED DESCRIPTION

Embodiments described herein include methods and apparatus for asynchronous data recovery, which may have one or more advantages over traditional asynchronous data recovery methods and apparatus. For example, embodiments of data recovery apparatus described herein may be implemented using relatively simple architectures, when compared with traditional asynchronous data recovery apparatus, because the various embodiments avoid the generation of multiple clock phases at clock rates designed to support over-sampling. More particularly, embodiments of data recovery methods described herein may exclude multiple-clock phase generation and over-sampling processes altogether. Accordingly, embodiments described herein may facilitate the generation of relatively low-complexity and low power consumptive data recovery apparatus, when compared with traditional data recovery methods and apparatus.

Various embodiments of asynchronous data recovery methods and apparatus, discussed herein, may be particularly beneficial when incorporated into interfaces that are adapted to support high-speed bit rates (e.g., bit rates in excess of 1 gigabit/second), such as DigRF4G interfaces and new generation Ser/Des interfaces. However, it is to be understood that the various embodiments also may be beneficial and/or useful when incorporated into interfaces that are adapted to support lower-speed bit rates (e.g., DigRF3G interfaces, older generation Ser/Des interfaces, and USBs, for example, but not by way of limitation). Accordingly, the scope of the inventive subject matter is intended to include asynchronous data recovery methods and apparatus and methods that may be incorporated into a wide variety of data recovery interfaces.

Figure 1:
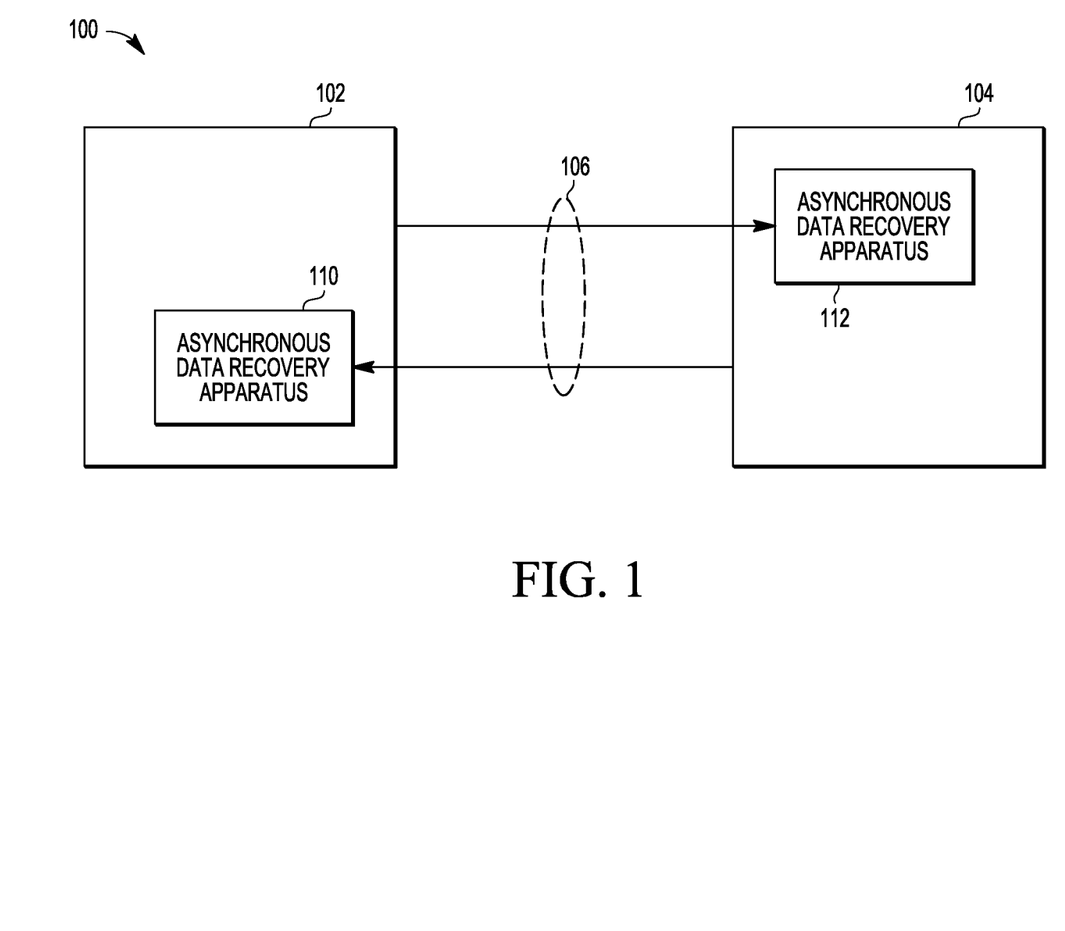
FIG. 1 illustrates a simplified block diagram of a system that includes at least two communication devices adapted to communicate with each other over an asynchronous interface, in accordance with an example embodiment.

FIG. 1 illustrates a simplified block diagram of a system 100 that includes at least two communication devices 102, 104 adapted to communicate with each other over an asynchronous interface 106, in accordance with an example embodiment. According to a particular embodiment, devices 102, 104 are adapted to communicate with each other by transmitting and receiving control and/or data message signals over a hardwired interface, although devices 102, 104 may be adapted to communicate over other types of asynchronous interfaces (e.g., air interfaces), in other embodiments. Devices 102, 104 may form all or portions of a variety of different types of apparatus. For example, but not by way of limitation, devices 102, 104 may be incorporated into cellular telephones, radios, personal data assistants (PDA), computers (e.g., a laptop, notebook, desktop or other type of computer), mobile internet devices (MID), and/or other devices that are adapted to transmit and receive signals over an asynchronous interface.

One or both of devices 102, 104 includes an asynchronous data recovery apparatus 110, 112 along its receiver lineup, according to an embodiment. The data recovery apparatus 110, 112 may be implemented on a receiver integrated circuit (IC) or a transceiver IC, according to various embodiments. Signals received over the asynchronous interface 106 are down-converted, demodulated, and converted to a baseband signal for further processing, among other things. Embodiments of asynchronous data recovery methods and apparatus may be implemented, for example, at an interface between a receiver or transceiver and a baseband processing subsystem (not illustrated) of a device 102, 104.

As will be explained in more detail below, embodiments of asynchronous data recovery methods and apparatus asynchronously detect data bits present in an asynchronous, serial bit stream, rather than over-sampling the bit stream, as is done in traditional data recovery methods and apparatus. Detected data bits may be asynchronously stored in a temporary storage location, and when the stored location becomes stable, the bit values may be synchronously fetched from temporary storage and transferred to the internal clock-domain of the system, according to an embodiment. Embodiments may eliminate the use of over-sampling and/or correlation methods used in traditional asynchronous data recovery methods and apparatus.

Figure 2:
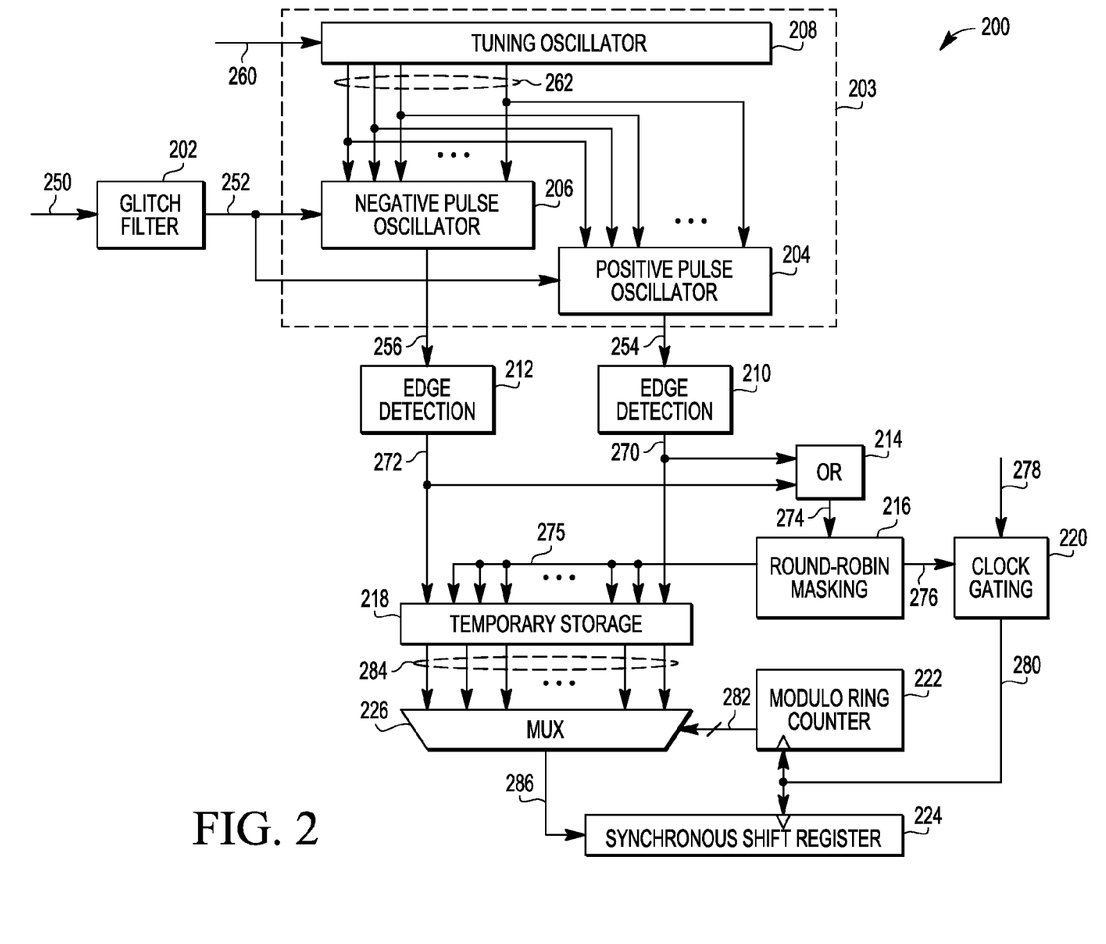
FIG. 2 illustrates a simplified block diagram of a data recovery architecture, in accordance with an example embodiment.

FIG. 2 illustrates a simplified block diagram of a data recovery architecture 200 (e.g., asynchronous data recovery apparatus 110 or 112, FIG. 1), in accordance with an example embodiment. Data recovery architecture 200 may be implemented, for example, in a receiver or transceiver integrated circuit (IC) that includes an asynchronous domain (e.g., circuitry in which data is processed asynchronously) and a synchronous domain (e.g., circuitry in which data is processed synchronously). Data recovery architecture 200 includes a glitch filter 202, a plurality of matched ring oscillators 203, first and second edge detection circuits 210, 212, OR logic block 214, round-robin masking circuit 216, temporary storage 218, clock gating circuit 220, modulo ring counter 222, multiplexer (MUX) 226, and synchronous shift register 224, according to an embodiment.

Glitch filter 202 is adapted to receive a serial bit stream 250 from other portions of the system (e.g., a decoder and parallel-to-serial converter, not illustrated). According to an embodiment, the serial bit stream 250 includes a series of bits that has been subjected to an 8-to-10 encoding operation prior to serialization, during which groups of 8 bits are mapped to 10 bit codes to ensure that the bits in the data stream toggle (e.g., between 1 and 0, or vice versa) at least once within a pre-defined number of bits (e.g., to ensure that the bit stream does not include more than six consecutive 0's or six consecutive 1's). In other embodiments, the serial bit stream 250 may include series of bits that have been encoded using other methods. Glitch filter 202 is adapted to filter the received bit stream 250 to remove or reduce undesired data line glitches (e.g., positive or negative spikes in the data line voltage levels, which have durations that are less than a pre-defined duration), which otherwise may be detected as valid data. According to an embodiment, glitch filter 202 may be implemented using a resistor-capacitor network and a buffer, although glitch filter 202 may be implemented using different circuitry, in other embodiments.

Glitch filter 202 produces a filtered, asynchronous, serial bit stream 252 (referred to below simply as "bit stream 252"). The bit stream 252 conveys a sequence of consecutive data bits, where each data bit may be represented as a first, relatively high voltage level or a second, relatively low voltage level that is maintained for the duration of a bit period. The bit stream 252 may be referred to herein as conveying a "logical 1" when the bit stream 252 has the first, relatively high voltage level for a duration of the bit period. Similarly, the bit stream 252 may be referred to herein as conveying a "logical 0" when the bit stream 252 has the second, relatively low voltage level for a duration of the bit period. It is to be understood that this convention is being used for the purposes of convenience, and not of limitation.

According to an embodiment, data bits within the bit stream 252 may be asynchronously detected by detecting a number of consecutive logical 1 data bits and/or logical 0 data bits from bit stream 252 using a plurality of oscillators 203 (e.g., including matched ring oscillators), according to an embodiment. The plurality of oscillators 203 includes a positive pulse oscillator 204, a negative pulse oscillator 206, and a tuning oscillator 208, according to an embodiment. As used herein, the term "pulse" may include a full pulse or a partial pulse. A "full pulse" includes an event, within a signal, that is defined by a first transition from a first voltage level (e.g., a relatively low voltage level) to a second voltage level (e.g., a relatively high voltage level), a period of voltage maintenance at the second voltage level, and a second transition from the second voltage level to the first voltage level. The period of voltage maintenance has a duration that is some portion of a bit period (e.g., from 10% to 90% of a bit period, or some other portion). A "partial pulse" includes an event, within a signal, that is defined by a first transition from a first voltage level (e.g., a relatively low voltage level or a relatively high voltage level) to a second voltage level (e.g., a relatively high voltage level or a relatively low voltage level).

Positive pulse oscillator 204 is adapted to receive the bit stream 252, and to produce a positive data detection signal 254, based on the voltage levels conveyed in the bit stream 252. More particularly, the positive data detection signal 254 is produced to include series of pulses (e.g., a series of one or more pulses), where the number of pulses in a particular series is roughly proportional to the duration of time that the bit stream 252 conveys an uninterrupted, relatively high voltage level. In other words, positive pulse oscillator 204 is enabled to actively oscillate (e.g., to produce pulses) only when the voltage level of the bit stream 252 is at a voltage level corresponding to a logical 1. The number of voltage level transition edges (referred to below simply as "edges" or "transitions") generated in conjunction with a particular series in the positive data detection signal 254 indicates a number of consecutive logical 1 data bits within the bit stream 252. More particularly, the number of edges generated indicates how many bit periods have elapsed between a 0-to-1 transition and a next 1-to-0 transition within bit stream 252. According to an embodiment, the number of edges generated has a 1:1 correlation with the number of bit periods during which the bit stream 252 has a relatively high voltage level (e.g., the number of consecutive logical 1's in bit stream 252).

An embodiment of a positive pulse oscillator (e.g., positive pulse oscillator 204) will be described in more detail later, in conjunction with FIG. 3.

Negative pulse oscillator 206 also is adapted to receive the bit stream 252, and to produce a negative data detection signal 256, based on the voltage levels conveyed in the bit stream 252. More particularly, the negative data detection signal 256 is produced to include series of pulses, where the number of pulses in a particular series corresponds to (e.g., is proportional to) the duration of time that the bit stream 252 conveys an uninterrupted, relatively low voltage level. In other words, negative pulse oscillator 206 is enabled to actively oscillate (e.g., to produce pulses) only when the voltage level of the bit stream 252 is at a voltage level corresponding to a logical 0. The number of edges generated in a particular series in the negative data detection signal 256 indicates a number of consecutive logical 0 data bits within the bit stream 252. More particularly, the number of edges generated indicates how many bit periods have elapsed between a 1-to-0 transition and a next 0-to-1 transition within bit stream 252. According to an embodiment, the number of edges generated has a 1:1 correlation with the number of bit periods during which the bit stream 252 has a relatively low voltage level (e.g., the number of consecutive logical 0's in bit stream 252). An embodiment of a negative pulse oscillator (e.g., negative pulse oscillator 206) will be described in more detail later, in conjunction with FIG. 4.

According to an embodiment, positive pulse oscillator 204 and negative pulse oscillator 206 include voltage controlled oscillators, for which the voltage applied to the oscillator (and accordingly the frequency of oscillation) corresponds to the values of a plurality of tuning control bits 262. In other embodiments, positive and negative pulse oscillators 204, 206 may include current controlled oscillators, numerically controlled oscillators, or some other type of oscillators.

According to an embodiment, the tuning control bits 262 are provided by tuning oscillator 208. Tuning oscillator 218 is adapted to "tune" the positive and negative pulse oscillators 204, 206 in a manner that accounts for process variations, temperature and humidity variations, and other factors that may otherwise cause the positive and negative pulse oscillators 204, 206 to operate in a manner that is unsynchronized with the incoming bit stream 252. According to an embodiment, tuning oscillator 208 is adapted to provide tuning control bits 262 having values that cause the positive pulse oscillator 204 and the negative pulse oscillator 206 to control their respective oscillators to oscillate at a frequency that corresponds to the bit rate of the incoming bit stream 252. In this manner, tuning oscillator 208 "tunes" the positive and negative pulse oscillators 204, 206 to the frequency (or bit rate) of the incoming bit stream 252. For example, in embodiments in which data recovery architecture 200 is implemented in a DigRF4G interface, tuning oscillator 208 may tune the positive and negative pulse oscillators 204 to oscillate at about 2.5 gigahertz, which corresponds to about a 2.5 gigabits/second bit rate.

According to an embodiment, tuning oscillator 208 has a substantially similar circuit configuration as the positive and negative pulse oscillators 204, 206, and is positioned in close proximity to the positive and negative pulse oscillators 204, 206. This ensures that tuning oscillator 208 may operate substantially similarly to the positive and negative pulse oscillators 204, 206, and that tuning oscillator 208 is exposed to a substantially similar physical environment (e.g., temperature, humidity, etc.). Using a received reference signal 260 (e.g., a clock signal), tuning oscillator 208 is adapted to determine oscillator control parameters (e.g., a voltage level, current level, or number of delay elements) appropriate to cause its internal oscillators to produce a signal that oscillates at a frequency that corresponds to the bit rate of the incoming bit stream 252. Upon determining the appropriate control parameters, tuning oscillator 208 is further adapted to provide the tuning control bits 262 that correspond to those control parameters. Tuning oscillator 218 may determine and update, when appropriate, the values for tuning control bits 262 continuously or occasionally (e.g., once every second or some other time period), according to various embodiments. By using a separate tuning oscillator 208 to tune the positive and negative pulse oscillators 204, 206, rather than having the positive and negative pulse oscillators 204, 206 perform their own tuning operations, the data recovery processes implemented by the positive and negative pulse oscillators 204, 206 may continue without interruptions that would otherwise be associated with tuning the positive and negative pulse oscillators 204, 206. In other words, tuning and data recovery may be performed simultaneously.

First and second edge detection circuits 210, 212 may be collectively referred to as "edge detection circuitry," and are adapted to detect transition edges (e.g., pulse edges) within the positive and negative data detection signals 254, 256, respectively. According to an embodiment, each of first and second edge detection circuits 210, 212 are adapted to detect both leading and trailing edges of pulses within the positive and negative data detection signals 254, 256, respectively, and to produce a pulse (or other indication of a detected transition edge) each time such an edge is detected.

More particularly, first edge detection circuit 210 is adapted to produce a pulse within a "store logical 1" signal 270 each time that first edge detection circuit 210 detects a transition edge (e.g., a leading or trailing pulse edge) within the positive data detection signal 254. Similarly, second edge detection circuit 212 is adapted to produce a pulse within a "store logical 0" signal 272 each time that second edge detection circuit 212 detects a transition edge (e.g., a leading or trailing pulse edge) within the negative data detection signal 256. The "store logical 1" signal 270 and the "store logical 0" signal 272 may be collectively referred to herein as "data storage signals."

The "store logical 1" signal 270 and the "store logical 0" signal 272 are provided to temporary storage 218 and to OR logic block 214. Temporary storage 218, which may also be referred to herein as "first data storage," includes a plurality of bit locations that are separately writable, when unmasked, with values that are reflected in the "store logical 1" signal 270 and the "store logical 0" signal 272, as will be described in more detail below. According to various embodiments, temporary storage 218 may be implemented with a plurality of set-reset (SR) latches (e.g., one SR latch for each bit location), a high-speed memory block (e.g., static random access memory (SRAM)), or a register file. In a particular embodiment in which temporary storage 218 is implemented with a plurality of SR latches, each set control input of the SR latches is operatively coupled to the "store logical 1" signal 270, and each reset control input of the SR latches is operatively coupled to the "store logical 0" signal 272. Accordingly, when a pulse is produced in the "store logical 1" signal 270, the set control input of any unmasked SR latch is pulsed, and thus a logical 1 is represented within that SR latch. Similarly, when a pulse is produced in the "store logical 0" signal 272, the reset control input of any unmasked SR latch is pulsed, and thus a logical 0 is represented within that SR latch. In embodiments in which high-speed memory, a register file, or some other data storage element is used to implement temporary storage 218, other techniques may be implemented to store logical 1's and logical 0's in the plurality of bit locations in response to the pulses in the store logical 1 and store logical 0 signals 270, 272. Such alternate embodiments are intended to be within the scope of the inventive subject matter.

As mentioned above, temporary storage 218 is adapted to receive the "store logical 1" and "store logical 0" signals 270, 272 and to update the data bits within unmasked bit locations within temporary storage 218 in response to pulses present in the "store logical 1" and "store logical 0" signals 270, 272. The masked and unmasked bit locations are defined according to a write mask, which is maintained by round-robin masking circuit 216 and is conveyed by write mask bits 275, described in more detail below. For example, when the "store logical 1" signal 270 includes a pulse that indicates that the positive pulse oscillator 204 is processing a positive pulse in the bit stream 252, a logical 1 data bit is stored in any unmasked bit location in temporary storage 218. Conversely, when the "store logical 0" signal 272 includes a pulse that indicates that the negative pulse oscillator 206 is processing a negative pulse in the bit stream 252, a logical 0 data bit is stored in any unmasked bit location in temporary storage 218.

The process of maintaining and updating the write mask (e.g., which is conveyed by write mask bits 275) is performed by OR logic block 214 and round-robin masking circuit 216. OR logic block 214 is adapted to receive the "store logical 1" and "store logical 0" signals 270, 272 from first and second edge detection circuits 210, 212, respectively, and to logically OR the received signals 270, 272 together. When either of the "store logical 1" or "store logical 0" signals 270, 272 conveys a pulse, OR logic block 214 is adapted to produce a corresponding pulse in a round-robin trigger signal 274 that is provided to round-robin masking circuit 216. When neither of the "store logical 1" nor "store logical 0" signals 270, 272 conveys a pulse, OR logic block 214 refrains from producing a corresponding pulse in the round-robin trigger signal 274.

Round-robin masking circuit 216 is adapted to receive and process the round-robin trigger signal 274, and to maintain a write mask associated with storing data within the bit locations of temporary storage 218. According to an embodiment, the write mask is represented and conveyed by a plurality of write mask bits 275. During normal operations, the round-robin write mask bits 275 are produced to have values that enable only one of the plurality of bit locations within temporary storage 218 to be written to (e.g., set or reset), while masking access to the other bit locations. Each time a pulse is produced in the round-robin trigger signal 274, round-robin masking circuit 216 circularly shifts the write mask by one location. This allows access to each of the bit locations within temporary storage 218 in a sequential and circular fashion. In a particular embodiment, temporary storage 218 includes eight bit locations, and the write mask includes eight corresponding bits. Round-robin masking circuit 216 causes the values for the eight write mask bits sequentially to circulate in an ascending order through the following series of hexadecimal values: 01, 02, 04, 08, 10, 20, 40, 80, whereupon the sequence is repeated. Accordingly, when a write mask having a hexadecimal value of 01 is applied to the eight bit temporary storage 218, only the least significant bit of temporary storage 218 may be modified (e.g., set or reset). In various alternate embodiments, temporary storage 218 may include more or fewer than eight bit locations, the write mask may correspondingly include more or fewer than eight bits, the values for the write mask bits may sequentially circulate in a descending circular order, and/or the write mask may include more or fewer than eight bits, and/or the values for the write mask bits may enable simultaneous access to multiple storage locations.

When a pre-defined number of bit locations within temporary storage 218 have been written since the last fetch operation from temporary storage 218 (e.g., when a pre-defined number of pulses have been received in the round-robin trigger signal 274), round-robin masking circuit 216 is configured to provide a clock trigger (e.g., a pulse) on a clock enable signal 276, which is provided to clock gating circuit 220. For example, when four (or some other number) of bit locations within temporary storage 218 have been written since the last fetch operation, round-robin masking circuit 216 may provide a clock trigger on clock enable signal 276. A clock trigger produced on the clock enable signal 276 indicates that the data stored within temporary storage 218 is considered to be stable, and that at least some of that data may be fetched from temporary storage 218.

Clock gating circuit 220 is adapted to receive a synchronous clock signal 278 and the clock enable signal 276. Synchronous clock signal 278 is a clock signal operating at a frequency that corresponds to the bit rate (e.g., about 2.5 GHz, in the case of a DigRF4G interface) or slower. When a clock trigger is conveyed in the clock enable signal 276, clock gating circuit 220 initiates a synchronous data fetch from temporary storage 218 by allowing a number of clock pulses to be gated through to clock signal 280. For example, the number of clock pulses that are allowed to be gated through to clock signal 280 may be the same as the number of written-to bit locations that triggers the round-robin masking circuit 216 to produce the clock trigger in the clock enable signal 276. The clock signal 280 is provided to modulo ring counter 222 and to synchronous shift register 224, according to an embodiment.

Modulo ring counter 222 is adapted to receive the clock signal 280. Each time that modulo ring counter 222 detects a clock pulse within clock signal 280, modulo ring counter 222 provides a select signal 282 to MUX 226, which identifies a single bit location within temporary storage 218. Modulo ring counter 222 then updates the single bit location identity to a next consecutive bit location, in anticipation of receiving a next clock pulse within clock signal 280. In an alternate embodiment, modulo ring counter 222 may identify multiple bit locations within temporary storage 218 (e.g., a number of bit locations up to the number of written-to bit locations since the last data fetch).

MUX 226 is adapted to receive the select signal 282 from modulo ring counter 222, and to access, in parallel, those selected data lines 284 that correspond to the bit location(s) indicated by the select signal 282. MUX 226 outputs the selected data 286 (e.g., serially) to synchronous shift register 224.

Synchronous shift register 224 also is adapted to receive the clock signal 280, and in response to clock pulses present within clock signal 280, synchronous shift register 224 clocks in the selected data 286 provided by MUX 226. According to an embodiment, synchronous shift register 224 is provided in a synchronous domain of the integrated circuit within which the data recovery architecture 200 is incorporated. Accordingly, the data clocked into synchronous shift register 224 may thereafter be synchronously fetched and processed.

Figure 3:
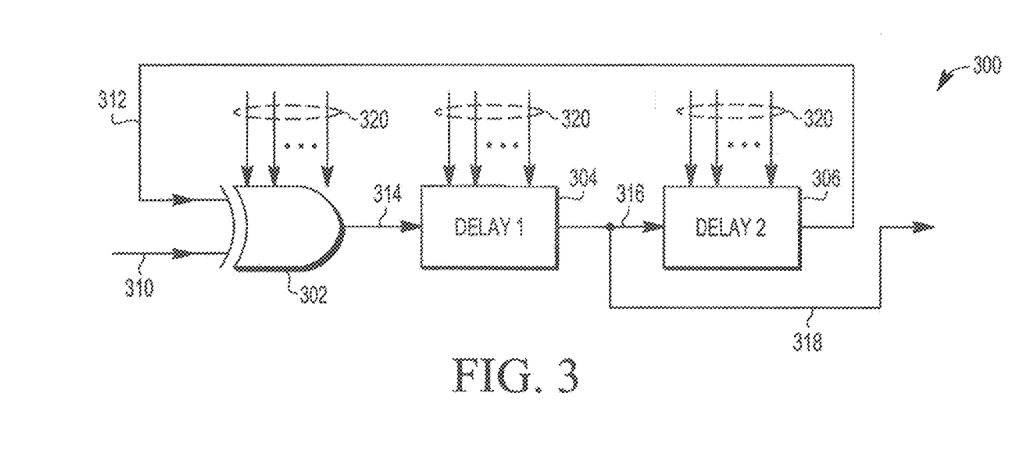
FIG. 3 illustrates a simplified block diagram of a positive pulse oscillator, in accordance with an example embodiment.

FIG. 3 illustrates a simplified block diagram of a positive pulse oscillator 300 (e.g., positive pulse oscillator 204, FIG. 2), in accordance with an example embodiment. Positive pulse oscillator 300 includes an exclusive OR (XOR) logic element 302 and a plurality of delay elements 304, 306, according to an embodiment. According to an embodiment, each of XOR element 302 and delay elements 304, 306 are tuned to a frequency associated with the bit rate of the incoming bit stream 310 based on received tuning control bits 320 (e.g., tuning control bits 262 from tuning oscillator 208, FIG. 2).

XOR element 302 is adapted to receive an incoming bit stream 310 (e.g., bit stream 252, FIG. 2) and a full-bit-period-delayed bit stream 312, and to apply an XOR operation on the received bit streams 310, 312 (i.e., 1 XOR 1=0, 0 XOR 0=0, and 1 XOR 0=1), to produce an XOR-modified bit stream 314. A first delay element 304 is adapted to receive the XOR-modified bit stream 314 and to delay the bit streams 310 and 312 by a period of time that corresponds to about one half of a bit period. First delay element 304 thus produces a half-bit-period-delayed, XOR-modified bit stream 316, which may be output as a positive data detection signal 318 (e.g., positive data detection signal 254, FIG. 2). A second delay element 306 is adapted to receive the half-bit-period-delayed, XOR-modified bit stream 316, and to delay the half-bit-period-delayed, XOR-modified bit stream 316 by a period of time that corresponds to about an additional one half of a bit period. Second delay element 306 thus produces a full-bit-period-delayed bit stream 312, which is fed back to XOR element 302. Through this configuration, positive pulse oscillator 300 may be activated to produce, as the positive data detection signal 318, a series of pulses (e.g., oscillations) at a frequency that corresponds to roughly half of the bit rate of the incoming bit stream 310 (e.g., bit stream 252, FIG. 2) whenever the incoming bit stream 310 has a relatively high voltage level (e.g., a voltage level corresponding to a logical 1), and positive pulse oscillator 300 is deactivated from producing the pulses whenever the incoming bit stream 310 has a relatively low voltage level (e.g., a voltage level corresponding to a logical 0).

Figure 4:
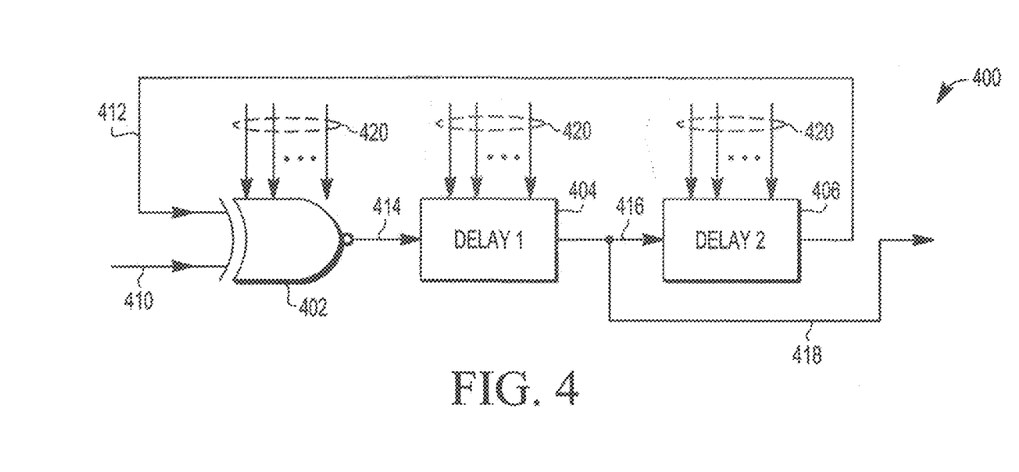
FIG. 4 illustrates a simplified block diagram of a negative pulse oscillator, in accordance with an example embodiment.

FIG. 4 illustrates a simplified block diagram of a negative pulse oscillator 400 (e.g., negative pulse oscillator 206, FIG. 2), in accordance with an example embodiment. Negative pulse oscillator 400 is similar to the positive pulse oscillator discussed in conjunction with FIG. 3, except that the negative pulse oscillator 400 produces inverted values, with respect to the positive pulse oscillator 300. Accordingly, negative pulse oscillator 400 includes an exclusive NOR (XNOR) logic element 402 and a plurality of delay elements 404, 406, according to an embodiment. According to an embodiment, each of XNOR element 402 and delay elements 404, 406 are tuned to a frequency associated with the bit rate of the incoming bit stream 410 based on received tuning control bits 420 (e.g., tuning control bits 262 from tuning oscillator 208, FIG. 2).

XNOR element 402 is adapted to receive an incoming bit stream 410 (e.g., bit stream 252, FIG. 2) and a full-bit-period-delayed bit stream 412, and to apply an XNOR operation on the received bit streams 410, 412 (i.e., 1 XNOR 1=1, 0 XNOR 0=1, and 1 XNOR 0=0), to produce an XNOR-modified bit stream 414. A first delay element 404 is adapted to receive the XNOR-modified bit stream 414 and to delay the bit streams 410 and 412 by a period of time that corresponds to about one half of a bit period. First delay element 404 thus produces a half-bit-period-delayed, XNOR-modified bit stream 416, which may be output as a negative data detection signal 418 (e.g., negative data detection signal 256, FIG. 2). A second delay element 406 is adapted to receive the half-bit-period-delayed, XNOR-modified bit stream 416, and to delay the half-bit-period-delayed, XNOR-modified bit stream 416 by a period of time that corresponds to about an additional one half of a bit period. Second delay element 406 thus produces a full-bit-period-delayed bit stream 412, which is fed back to XNOR element 402. Through this configuration, negative pulse oscillator 400 may be activated to produce, as the negative data detection signal 418, a series of pulses (e.g., oscillations) at a frequency that corresponds to roughly half of the bit rate of the incoming bit stream 410 (e.g., bit stream 252, FIG. 2) whenever the incoming bit stream 410 has a relatively low voltage level (e.g., a voltage level corresponding to a logical 0), and negative pulse oscillator 400 is deactivated from producing the pulses whenever the incoming bit stream 410 has a relatively high voltage level (e.g., a voltage level corresponding to a logical 1).

FIGS. 3 and 4 illustrate particular embodiments of a positive pulse oscillator 300 and a negative pulse oscillator 400, respectively. It is to be understood that other circuit configurations alternatively may be used to generate a positive data detection signal and a negative data detection signal (e.g., signals 254, 256, FIG. 2 or signals 318, 418, FIGS. 3 and 4). Accordingly, the specific embodiments illustrated in FIGS. 3 and 4 and described herein are not intended to limit the scope of the inventive subject matter only to those embodiments. Any circuits that are adapted to produce suitable positive and negative data detection signals may be used, in alternate embodiments.

Figure 5:
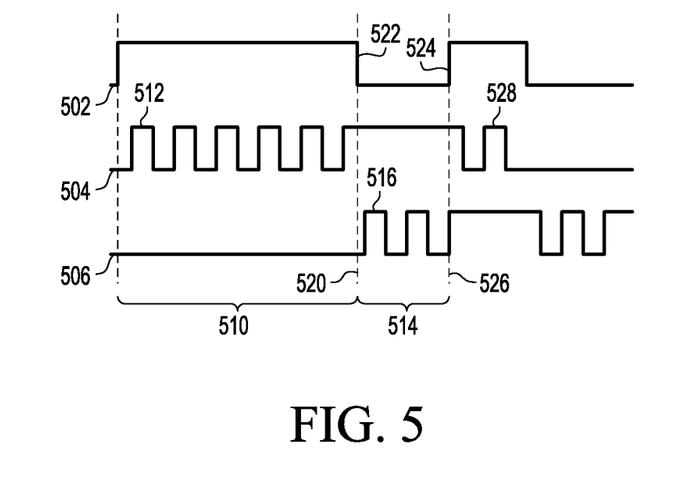
FIG. 5 illustrates a timing diagram of data-dependent signals produced by positive and negative pulse oscillators, in accordance with an example embodiment.

FIG. 5 illustrates a timing diagram of data-dependent signals produced by positive and negative pulse oscillators (e.g., positive and negative pulse oscillators 300, 400, FIGS. 3 and 4), in accordance with an example embodiment. More particularly, the timing diagram includes a data signal 502 representing relatively high and relatively low voltage levels (e.g., logical 1's and logical 0's) on a data line (e.g., bit stream 252, FIG. 2), a positive data detection signal 504 produced by a positive pulse oscillator (e.g., positive data detection signal 254, FIG. 2), and a negative data detection signal 506 produced by a negative pulse oscillator (e.g., negative data detection signal 256, FIG. 2).

As FIG. 5 illustrates, during a time period 510 when the data signal 502 has a relatively high voltage level, the positive data detection signal 504 conveys a series of pulses 512, and the negative data detection signal 506 remains at a relatively constant voltage level (e.g., a relatively low voltage level). In an embodiment in which each transition in the positive data detection signal 504 indicates a data bit having a logical 1 value, the ten edges associated with the series of five pulses 512 and the subsequent 0-to-1 transition illustrated in FIG. 5 indicate eleven consecutive logical 1's in the bit stream. During a subsequent time period 514 when the data signal 502 has a relatively low voltage level, the negative data detection signal 506 conveys a series of pulses 516, and the positive data detection signal 504 remains at a relatively constant voltage level (e.g., a relatively high voltage level). Again, in an embodiment in which each transition in the negative data detection signal 506 indicates a data bit having a logical 0 value, the four edges associated with the series of two pulses 516 and the subsequent 0-to-1 transition illustrated in FIG. 5 indicates five consecutive logical 0's in the bit stream. According to an embodiment, only one of the positive or negative data detection signals 504, 506 may convey pulses (or produce transitions) at any given time (e.g., only one of the positive pulse oscillator 204 or the negative pulse oscillator 206, FIG. 2, may be actively producing pulses at any given time).

According to an embodiment, the relatively constant voltage level of the positive or negative data detection signal 504, 506 corresponds to the voltage level of the positive or negative data detection signal 504, 506 when a transition occurs in the data signal 502. For example, at time 520 when a high-to-low transition 522 occurs in data signal 502, the positive data detection signal 504 is at a relatively high voltage level, and that relatively high voltage level is maintained until a low-to-high transition 524 occurs in data signal 502 at a subsequent time 526, at which time positive data detection signal 504 again conveys a series of pulses 528 (i.e., a series of one pulse 528, in this instance).

Figure 6:
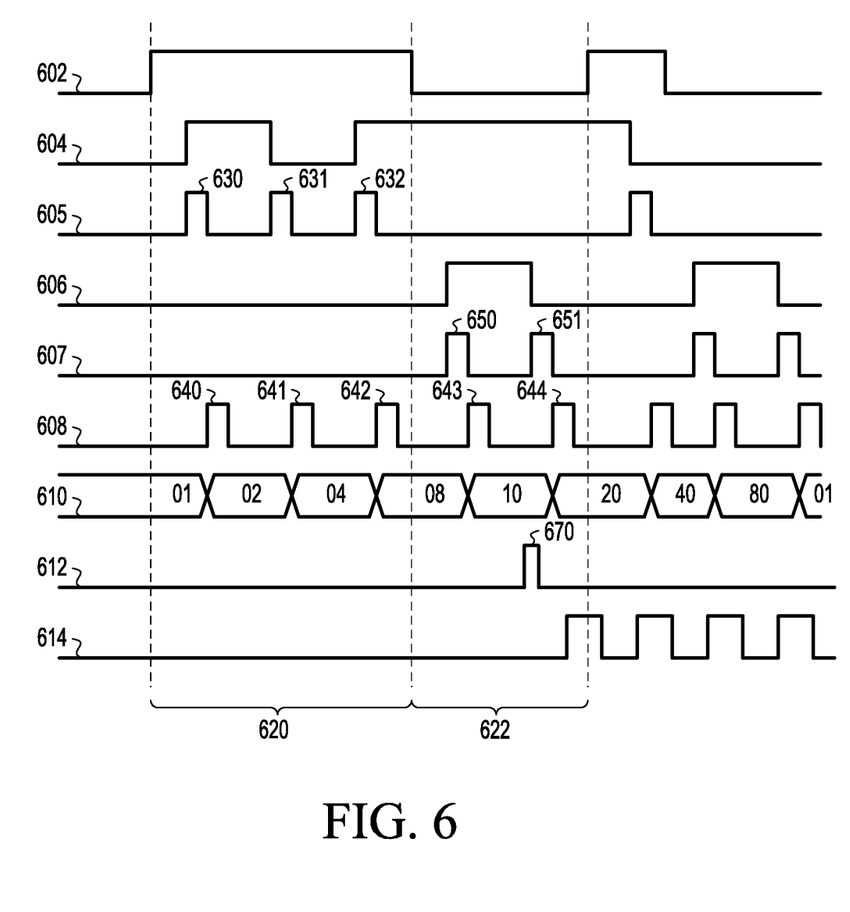
FIG. 6 illustrates a timing diagram of signals produced within the data recovery architecture of FIG. 2, in accordance with an example embodiment.

FIG. 6 illustrates a timing diagram of signals produced within the data recovery architecture 200 of FIG. 2, in accordance with an example embodiment. As with the timing diagram of FIG. 5, the timing diagram of FIG. 6 also includes data signal 602, a positive data detection signal 604 (e.g., positive data detection signal 254, FIG. 2), and a negative data detection signal 606 (e.g., negative data detection signal 256, FIG. 2). However, the timing diagram of FIG. 6 also includes a store logical 1 signal 605 (e.g., store logical 1 signal 270 produced by first edge detection circuit 210, FIG. 2), a store logical 0 signal 607 (e.g., store logical 0 signal 272 produced by second edge detection circuit 212, FIG. 2), round-robin trigger signal 608 (e.g., round-robin trigger signal 274 produced by OR logic block 214, FIG. 2), round-robin write mask bits 610 (e.g., round-robin write mask bits 275 produced by round-robin masking circuit 216, FIG. 2), a clock enable signal 612 (e.g., clock enable signal 276 produced by round-robin masking circuit 216, FIG. 2), and a clock signal 614 (e.g., clock signal 280 produced by clock gating circuit 220, FIG. 2).

During a first time period 620, data signal 602 has a relatively high voltage level, enabling positive data detection signal 604 to oscillate. At each edge of positive data detection signal 604, a pulse 630, 631, 632 is produced in store logical 1 signal 605 (e.g., by first edge detection circuit 212, FIG. 2). As discussed previously, each edge of positive data detection signal 604 indicates a data bit having a logical 1 value, and accordingly the three edges that occur during time period 620 indicate three consecutive logical 1's in the bit stream. At the time when the first pulse 630 is produced in store logical 1 signal 605, the hexadecimal value of the write mask is "01", as represented by round-robin mask bits 610. Accordingly, when the first pulse 630 occurs in store logical 1 signal 605, a logical 1 value is written into a least significant bit of the temporary storage (e.g., temporary storage 218, FIG. 2). However, each pulse 630-632 in store logical 1 signal 605 induces the production of a corresponding pulse 640, 641, 642 in round-robin trigger signal 610, and each pulse 640-642 in round-robin trigger signal 610 causes the round-robin masking circuit (e.g., round-robin masking circuit 216, FIG. 2) to rotate the write mask by one bit. Accordingly, the first pulse 640 in round-robin trigger signal 610 induces the round-robin masking circuit to rotate the write mask to have a hexadecimal value of "02", as represented by round-robin mask bits 610. This enables a logical 1 value to be written to a second least significant bit of the temporary storage when the second pulse 631 is produced in store logical 1 signal. Similarly, the second pulse 641 in round-robin trigger signal 610 induces the write mask to be updated to a value of "04," and the third pulse 642 induces the write mask to be updated to a value of "08."

During a second time period 622, data signal 602 has a relatively low voltage level, enabling negative data detection signal 606 to oscillate. At each edge of negative data detection signal 606, a pulse 650, 651, is produced in store logical 0 signal 607 (e.g., by second edge detection circuit 214, FIG. 2). Each edge of negative data detection signal 606 indicates a data bit having a logical 0 value, and accordingly the two edges that occur during time period 622 indicate two consecutive logical 0's in the bit stream. At the time when the first pulse 660 is produced in store logical 0 signal 607, the hexadecimal value of the write mask is "08", as represented by round-robin mask bits 610. Accordingly, when the first pulse 650 occurs in store logical 0 signal 607, a logical 0 value is written into a fourth least significant bit of the temporary storage. As with the pulses in the store logical 1 signal 605, each pulse 650, 651 in store logical 0 signal 607 induces the production of a corresponding pulse 643, 644 in round-robin trigger signal 610. Accordingly, the fourth pulse 643 in round-robin trigger signal 610 induces the round-robin masking circuit to rotate the write mask to have a hexadecimal value of "10", as represented by round-robin mask bits 610. This enables a logical 0 value to be written to a fifth least significant bit of the temporary storage when the second pulse 651 is produced in store logical 0 signal. Similarly, the fifth pulse 644 in round-robin trigger signal 610 induces the write mask to be updated to a value of "20." The processes of detecting edges in the positive and negative data detection signals 604, 606, generating corresponding pulses in the store logical 1 signal 605 and the store logical 0 signal 607, and generating corresponding pulses in the round-robin trigger signal 610 continue thereafter. Accordingly, the write mask indicated by the round-robin mask bits 610 continues to rotate through the values of "40" and "80", and then back to "01", to repeat the circular sequence of write mask values.

At some point, a clock trigger 670 (e.g., a pulse) is produced (e.g., by round-robin masking circuit 216, FIG. 2) in the clock enable signal 612. The clock trigger 670 enables the clock signal 614 to be passed (e.g., by clock gating circuit 220, FIG. 2) to the portions of the data recovery architecture that are adapted to fetch the data bits from temporary storage (e.g., modulo ring counter 222 and synchronous shift register 224), as described previously in conjunction with FIG. 2.

Figure 7:
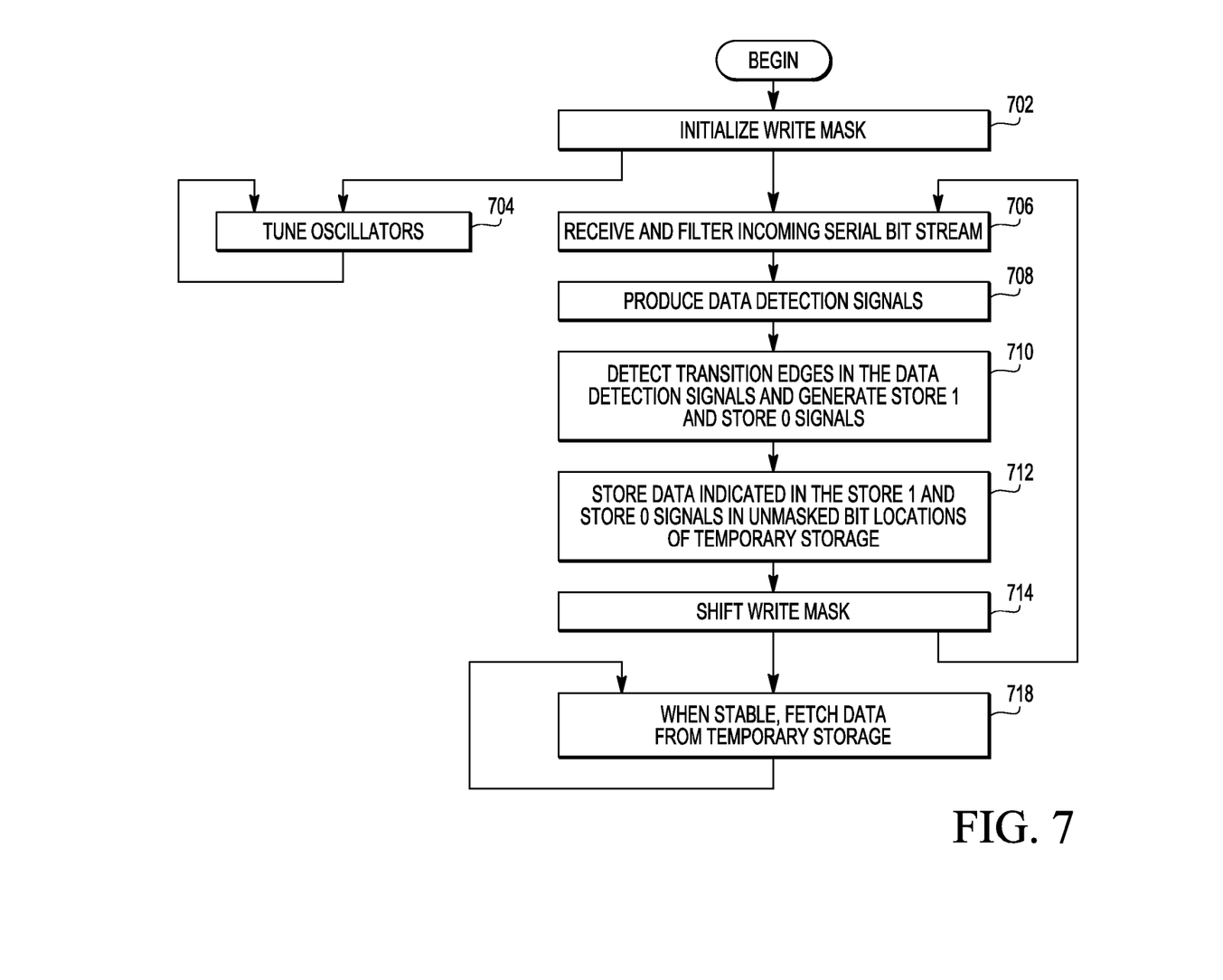
FIG. 7 illustrates a flowchart of a method for performing asynchronous data recovery, according to an example embodiment.

In order to explain the inventive subject matter more clearly, FIG. 7 illustrates a flowchart of a method for performing data recovery (e.g., by data recovery apparatus 200, FIG. 2), according to an example embodiment. Embodiments of the method may be performed in a data recovery apparatus, such as an apparatus that includes the data recovery architecture 200 of FIG. 2. To facilitate understanding, the process blocks of FIG. 7 will be discussed in conjunction with the logical blocks of FIG. 2, and therefore various elements of FIG. 2 will be referred to in the below description. It is to be understood that embodiments of methods for performing data recovery, described herein, may be performed by apparatus having architectures that are different from the data recovery architecture 200 illustrated in FIG. 2. Therefore, reference to various elements of FIG. 2 is not meant to limit the scope of the inventive subject matter to implementation by those specific elements.

The method may begin, in block 702, by initializing a write mask. As discussed previously, the write mask includes a plurality of write mask bits (e.g., write mask bits 275), which have values that define which of a plurality of bit locations in temporary storage (e.g., temporary storage 218) are writable, while masking access to the other bit locations. In an embodiment in which the write mask includes eight bits (although it may have more or fewer), the write mask may be initialized to a hexadecimal value of "01", for example, which corresponds to the least significant bit of an eight-bit temporary storage being unmasked (i.e., writable). The write mask may include more or fewer bits and/or may be initialized to different values, in other embodiments.

According to an embodiment, after initializing the write mask, the process of performing asynchronous data detection (e.g., blocks 706-714) may be performed in parallel with the process of tuning the oscillators that are used to perform the data detection (e.g., block 704). In addition, and as will be described later, when data produced from the data detection process is available in temporary storage, the process of fetching the data from temporary storage (e.g., block 718) may be performed in parallel with performing asynchronous data detection (e.g., blocks 706-714) and/or tuning the oscillators (e.g., block 704). For ease of explanation, these three, potentially-parallel processes will be discussed sequentially.

Regarding the process of tuning the oscillators, and as discussed previously, the plurality of oscillators (e.g., positive pulse oscillator 204 and negative pulse oscillator 206) used for data detection may be tuned (e.g., by tuning oscillator 218), in block 704. For example, and as discussed previously, the tuning oscillator may generate tuning control bits and provide those tuning control bits to the plurality of oscillators. To indicate that tuning of the plurality of oscillators may be performed continuously or occasionally, block 704 is shown to iterate, in FIG. 7.

In parallel with the process of tuning the oscillators, the process of performing asynchronous data detection (e.g., blocks 706-714) may be performed. In block 706, an incoming, serial bit stream (e.g., serial bit stream 250) is received (e.g., by data recovery architecture 200) and filtered (e.g., by glitch filter 202) to remove or reduce undesired data line glitches, resulting in a filtered, asynchronous, serial bit stream (e.g., bit stream 252). Asynchronous detection of data bits within the bit stream is then performed.

According to an embodiment, asynchronous data detection includes producing, in block 708, at least one data detection signal to indicate the presence of logical 1's and logical 0's in the bit stream. According to a more particular embodiment, asynchronous data detection may be performed by a plurality of oscillators. More particularly, a first oscillator (e.g., positive pulse oscillator 204) is enabled to actively produce pulses (e.g., at a frequency that corresponds to the bit rate of the bit stream) when the voltage level of the bit stream is at a voltage level corresponding to a logical 1, and to convey those pulses in a first data detection signal (e.g., positive data detection signal 254). In addition, a second oscillator (e.g., negative pulse oscillator 206) is enabled to actively produce pulses (e.g., at a frequency that corresponds to the bit rate of the bit stream) when the voltage level of the bit stream is at a voltage level corresponding to a logical 0, and to convey those pulses in a second data detection signal (e.g., negative data detection signal 256).

In block 710, transition edges are detected in the first and second data detection signals, and corresponding store logical 1 and store logical 0 signals are produced. According to an embodiment, the transition edges within the first data detection signal may be detected by a first edge detection circuit (e.g., first edge detection circuit 210), and transition edges within the second data detection signal may be detected by a second edge detection circuit (e.g., second edge detection circuit 212). The first edge detection circuit produces a pulse within a store logical 1 signal (e.g., store logical 1 signal 270) each time that the first edge detection circuit detects a transition edge (e.g., a leading or trailing pulse edge) within the first data detection signal. Similarly, the second edge detection circuit produces a pulse within a store logical 0 signal (e.g., store logical 0 signal 272) each time that the second edge detection circuit detects a transition edge (e.g., a leading or trailing pulse edge) within the second data detection signal.

In block 712, data indicated in the store logical 1 and store logical 0 signals is stored in unmasked bit locations of a temporary storage (e.g., temporary storage 218). More particularly, the temporary storage is adapted to receive the store logical 1 and store logical 0 signals, and to update the data bits within unmasked bit locations within the temporary storage in response to data indicated (e.g., pulses present) in the store logical 1 and store logical 0 signals. The masked and unmasked bit locations are defined according to a write mask, which is maintained by a round-robin masking circuit (e.g., round-robin masking circuit 216) and is conveyed through a plurality of write mask bits (e.g., write mask bits 275). According to an embodiment, the write mask bits may be produced to have values that enable only one of the plurality of bit locations within the temporary storage to be written to (e.g., set or reset), while masking access to the other bit locations.

In block 714, the write mask is shifted, according to an embodiment. More particularly, a round-robin mask trigger may be produced based on the store logical 1 and store logical 0 signals (e.g., store logical 1 and store logical 0 signals 270, 272) from the first and second edge detection circuits. According to an embodiment, when either of the store logical 1 or store logical 0 signals conveys a pulse, a corresponding pulse is produced (e.g., by OR logic block 214) in a round-robin trigger signal (e.g., round-robin trigger signal 274) that is provided to the round-robin masking circuit. Each time a pulse is produced in the round-robin trigger signal, the round-robin masking circuit circularly shifts the write mask by one location (e.g., to "02" during a first iteration of block 714). This establishes a correct value for the write mask for the next writing operation into the temporary storage. The method may then iterate as shown in FIG. 7.

In addition, when a determination is made that the data within the temporary storage is stable, then the data is fetched from temporary storage, in block 718. According to an embodiment, this determination may be made by the round-robin masking circuit, and the data is considered to be stable when a pre-defined number of bit locations within the temporary storage have been written since the last fetch operation from the temporary storage (e.g., when a pre-defined number of pulses have been received in the round-robin trigger signal). According to an embodiment, when the determination is made that the data is stable, a clock trigger (e.g., a pulse) is provided (e.g., by round-robin masking circuit 216) within a clock enable signal (e.g., clock enable signal 276). The clock enable signal is provided to a clock gating circuit (e.g., clock gating circuit 220), and when a clock trigger is conveyed in the clock enable signal, the clock gating circuit may initiate a synchronous data fetch from the temporary storage by allowing a number of clock pulses to be gated through to a modulo ring counter (e.g., modulo ring counter 222) and a synchronous shift register (e.g., synchronous shift register 224), according to an embodiment.

Each time that the modulo ring counter detects a clock pulse, the modulo ring counter provides a select signal (e.g., select signal 282) to a multiplexer (e.g., MUX 226), which identifies a single bit location within the temporary storage. The modulo ring counter then updates the single bit location identity to a next consecutive bit location (i.e., the modulo ring counter is incremented), in anticipation of receiving a next clock pulse. In an alternate embodiment, the modulo ring counter may identify multiple bit locations within the temporary storage. The multiplexer accesses, in parallel, one or more data lines (e.g., data lines 284) that correspond to the bit location(s) indicated by the select signal. The multiplexer outputs the selected data (e.g., data 286) to the synchronous shift register (e.g., synchronous shift register 224), which is clocked synchronously with the modulo ring counter. To indicate that fetching the data from temporary storage may be performed continuously or occasionally (and in parallel with blocks 704 and 706-714), block 718 is shown to iterate, in FIG. 7. As discussed previously, the data clocked into the synchronous shift register may thereafter be synchronously fetched and processed.

It is to be understood that certain ones of the process blocks depicted in FIG. 7 may be performed in parallel with each other or with performing other processes. In particular, and as indicated previously, blocks 704, 706, 708, 710, 712, 714, and 718 may be continuously performed in parallel, with each block processing data associated with different portions of a bit stream. In addition, it is to be understood that the particular ordering of the process blocks depicted in FIG. 7 may be modified, while achieving substantially the same result. Accordingly, such modifications are intended to be included within the scope of the inventive subject matter.

Thus, various embodiments of data recovery methods and apparatus have been described. An embodiment of a data recovery apparatus includes a plurality of oscillators, edge detection circuitry, and first data storage. The plurality of oscillators is adapted to receive a serial bit stream, and to generate data detection signals conveying first series of pulses during first time periods for which the serial bit stream conveys a logical 1, and conveying second series of pulses during second time periods for which the serial bit stream conveys a logical 0. The edge detection circuitry is operatively coupled with the plurality of oscillators, and is adapted to receive the data detection signals, to detect transition edges of the first series of pulses and the second series of pulses within the data detection signals, and to generate data storage signals that include first indications of detected transition edges in the first series of pulses and second indications of detected transition edges in the second series of pulses. The first data storage is operatively coupled with the edge detection circuitry and includes a plurality of bit locations. The first data storage is adapted to receive the data storage signals, to write a logical 1 into an unmasked subset of the plurality of bit locations in response to receiving a first indication of a detected transition edge in the first series of pulses, and to write a logical 0 into the unmasked subset of the plurality of bit locations in response to receiving a second indication of a detected transition edge in the second series of pulses.

Another embodiment of a data recovery apparatus includes a first oscillator, a second oscillator, edge detection circuitry, and temporary storage. The first oscillator is adapted to receive a serial bit stream and to generate a first data detection signal based on the serial bit stream, where the first oscillator conveys oscillations in the first data detection signal during first time periods for which the serial bit stream conveys a relatively high voltage level. The second oscillator is adapted to receive the serial bit stream and to generate a second data detection signal based on the serial bit stream, where the second oscillator conveys oscillations in the second data detection signal during second time periods for which the serial bit stream conveys a relatively low voltage level. The edge detection circuitry is operatively coupled with the first and second oscillators, and is adapted to receive the first and second data detection signals, to detect transition edges within the first and second data detection signals, and to generate data storage signals that include first indications of detected transition edges in the first data detection signal and second indications of detected transition edges in the second data detection signal. The temporary storage is operatively coupled with the edge detection circuitry and includes a plurality of bit locations. The temporary storage is adapted to receive the data storage signals, to write a logical 1 into a subset of the plurality of bit locations in response to receiving a first indication of a detected transition edge in the first data detection signal, and to write a logical 0 into the subset of the plurality of bit locations in response to receiving a second indication of a detected transition edge in the second data detection signal.

Another embodiment includes a method for asynchronously detecting data in a serial bit stream. The method comprises the steps of generating a first data detection signal based on the serial bit stream, where the first data detection signal is generated to convey oscillations during first time periods for which the serial bit stream conveys a relatively high voltage level, and generating a second data detection signal based on the serial bit stream, where the second data detection signal is generated to convey oscillations during second time periods for which the serial bit stream conveys a relatively low voltage level. The method also includes generating first indications of detected transition edges in the first data detection signal and second indications of detected transition edges in the second data detection signal, writing a logical 1 into an unmasked bit location of a plurality of bit locations of a temporary storage in response to each of the first indications, and writing a logical 0 into the unmasked bit location of the plurality of bit locations in response to each of the second indications.

While the principles of the inventive subject matter have been described above in connection with specific systems, apparatus, and methods, it is to be clearly understood that this description is made only by way of example and not as a limitation on the scope of the inventive subject matter. The various functions or processing blocks discussed herein and illustrated in the Figures may be implemented in hardware, firmware, software or any combination thereof. Further, the phraseology or terminology employed herein is for the purpose of description and not of limitation.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. A data recovery apparatus comprising:
   a plurality of oscillators adapted to receive a serial bit stream, and to generate data detection signals conveying first series of pulses during first time periods for which the serial bit stream conveys a logical 1, and conveying second series of pulses during second time periods for which the serial bit stream conveys a logical 0;
   edge detection circuitry operatively coupled with the plurality of oscillators, wherein the edge detection circuitry is adapted to receive the data detection signals, to detect transition edges of the first series of pulses and the second series of pulses within the data detection signals, and to generate data storage signals that include first indications of detected transition edges in the first series of pulses and second indications of detected transition edges in the second series of pulses; and
   first data storage operatively coupled with the edge detection circuitry, wherein the first data storage includes a plurality of bit locations, and the first data storage is adapted to receive the data storage signals, to write a logical 1 into an unmasked subset of the plurality of bit locations in response to receiving a first indication of a detected transition edge in the first series of pulses, and to write a logical 0 into the unmasked subset of the plurality of bit locations in response to receiving a second indication of a detected transition edge in the second series of pulses.

2. The data recovery apparatus of claim 1, wherein the data detection signals include a positive data detection signal and a negative data detection signal, and the plurality of oscillators comprises:
a positive pulse oscillator adapted to receive the serial bit stream and to generate the positive data detection signal with the first series of pulses; and
a negative pulse oscillator adapted to receive the serial bit stream and to generate the negative data detection signal with the second series of pulses.

3. The data recovery apparatus of claim 2, wherein the plurality of oscillators further comprises:
a tuning oscillator operatively coupled with the positive pulse oscillator and with the negative pulse oscillator, and adapted to tune the positive pulse oscillator and the negative pulse oscillator, wherein tuning by the tuning oscillator occurs simultaneously with data recovery processes implemented by the positive pulse oscillator and the negative pulse oscillator.

4. The data recovery apparatus of claim 2, wherein the positive pulse oscillator comprises:
an exclusive OR (XOR) logic element adapted to receive and apply an XOR operation to the serial bit stream and a full-period-delayed bit stream in order to produce an XOR-modified bit stream;
a first delay element adapted to delay the XOR-modified bit stream by a first period of time that corresponds to a first portion of a bit period in order to produce a delayed, XOR-modified bit stream, which is output as the positive data detection signal; and
a second delay element adapted to delay the delayed, XOR-modified bit stream by a second period of time that corresponds to a second portion of the bit period in order to produce the full-period-delayed bit stream.

5. The data recovery apparatus of claim 2, wherein the negative pulse oscillator comprises:
an exclusive NOR (XNOR) logic element adapted to receive and apply an XNOR operation to the serial bit stream and a full-period-delayed bit stream in order to produce an XNOR-modified bit stream;
a first delay element adapted to delay the XNOR-modified bit stream by a first period of time that corresponds to a first portion of a bit period in order to produce a delayed, XNOR-modified bit stream, which is output as the negative data detection signal; and
a second delay element adapted to delay the delayed, XNOR-modified bit stream by a second period of time that corresponds to a second portion of the bit period in order to produce the full-period-delayed bit stream.

6. The data recovery apparatus of claim 2, wherein the data storage signals include a store logical 1 signal and a store logical 0 signal, and the edge detection circuitry comprises:
a first edge detection circuit operatively coupled with the positive pulse oscillator, wherein the first edge detection circuit is adapted to receive the positive data detection signal, to detect transition edges in the positive data detection signal, and to generate the store logical 1 signal with the first indications; and
a second edge detection circuit operatively coupled with the negative pulse oscillator, wherein the second edge detection circuit is adapted to receive the negative data detection signal, to detect transition edges in the negative data detection signal, and to generate the store logical 0 signal with the second indications.

7. The data recovery apparatus of claim 1, further comprising:
a logic block operatively coupled with the edge detection circuitry, wherein the logic block is adapted to receive the data storage signals, and to generate a trigger signal that includes a round-robin mask trigger for each of the first indications and the second indications; and
a round-robin masking circuit operatively coupled with the logic block, wherein the round-robin masking circuit is adapted to receive the trigger signal, to maintain a write mask that indicates the unmasked subset of the plurality of bit locations, and to shift the write mask each time a round-robin mask trigger is received in the trigger signal.

8. The data recovery apparatus of claim 7, further comprising:
a clock gating circuit adapted to receive a clock trigger, and in response to receiving the clock trigger, to initiate a synchronous data fetch from the first data storage by providing a clock signal;
a modulo ring counter adapted to detect a clock pulse in the clock signal, and in response to the detected clock pulse, to provide a select signal to a multiplexer;
the multiplexer adapted to access one or more data lines from the first data storage that correspond to bit locations indicated by the select signal; and
a synchronous shift register adapted to detect the clock pulse in the clock signal, and in response to the detected clock pulse, to clock data present on the one or more data lines into the synchronous shift register.

9. The data recovery apparatus of claim 1, further comprising:
a glitch filter operatively coupled to the plurality of oscillators, wherein the glitch filter is adapted to receive an incoming bit stream, and to filter out glitches in the incoming bit stream in order to generate the serial bit stream for the plurality of oscillators.

10. The data recovery apparatus of claim 1, wherein the first data storage includes a type of data storage selected from a group consisting of set-reset latches, high-speed memory, and a register file.

11. A data recovery apparatus comprising:
a first oscillator adapted to receive a serial bit stream and to generate a first data detection signal based on the serial bit stream, wherein the first oscillator conveys oscillations in the first data detection signal during first time periods for which the serial bit stream conveys a relatively high voltage level;
a second oscillator adapted to receive the serial bit stream and to generate a second data detection signal based on the serial bit stream, wherein the second oscillator conveys oscillations in the second data detection signal during second time periods for which the serial bit stream conveys a relatively low voltage level;
edge detection circuitry operatively coupled with the first and second oscillators, wherein the edge detection circuitry is adapted to receive the first and second data detection signals, to detect transition edges within the first and second data detection signals, and to generate data storage signals that include first indications of detected transition edges in the first data detection signal and second indications of detected transition edges in the second data detection signal; and
temporary storage operatively coupled with the edge detection circuitry, wherein the temporary storage includes a plurality of bit locations, and the temporary storage is adapted to receive the data storage signals, to write a logical 1 into a subset of the plurality of bit locations in response to receiving a first indication of a detected transition edge in the first data detection signal, and to write a logical 0 into the subset of the plurality of bit locations in response to receiving a second indication of a detected transition edge in the second data detection signal.

12. The data recovery apparatus of claim 11, further comprising:
a tuning oscillator operatively coupled with the first and second oscillators, and adapted to tune the first and second oscillators, wherein tuning by the tuning oscillator occurs simultaneously with data recovery processes implemented by the first and second oscillators.

13. The data recovery apparatus of claim 11, wherein the data storage signals include a store logical 1 signal and a store logical 0 signal, and the edge detection circuitry comprises:
a first edge detection circuit operatively coupled with the first oscillator, wherein the first edge detection circuit is adapted to receive the first data detection signal, to detect transition edges in the first data detection signal, and to generate the store logical 1 signal with the first indications; and
a second edge detection circuit operatively coupled with the second oscillator, wherein the second edge detection circuit is adapted to receive the second data detection signal, to detect transition edges in the second data detection signal, and to generate the store logical 0 signal with the second indications.

14. The data recovery apparatus of claim 11, further comprising:
a logic block operatively coupled with the edge detection circuitry, wherein the logic block is adapted to receive the data storage signals, and to generate a trigger signal that includes a round-robin mask trigger for each of the first indications and the second indications; and
a round-robin masking circuit operatively coupled with the logic block, wherein the round-robin masking circuit is adapted to receive the trigger signal, to maintain a write mask that indicates masked bit locations and unmasked bit locations of the plurality of bit locations of the temporary storage, wherein the unmasked bit locations correspond to the subset of the plurality of bit locations, and wherein the round-robin masking circuit is also adapted to shift the write mask each time a round-robin mask trigger is received in the trigger signal.

15. The data recovery apparatus of claim 11, wherein the temporary storage comprises:
a plurality of set-reset latches, wherein a set control input of each of the set-reset latches is operatively coupled to receive the first indications, and a reset control input of each of the set-reset latches is operatively coupled to receive the second indications.

16. A method for asynchronously detecting data in a serial bit stream, the method comprising the steps of:

generating, by a first oscillator, a first data detection signal based on the serial bit stream, wherein the first data detection signal is generated to convey oscillations during first time periods for which the serial bit stream conveys a relatively high voltage level;
generating, by a second oscillator, a second data detection signal based on the serial bit stream, wherein the second data detection signal is generated to convey oscillations during second time periods for which the serial bit stream conveys a relatively low voltage level;
generating, by first circuitry, first indications of detected transition edges in the first data detection signal and second indications of detected transition edges in the second data detection signal;
storing, in temporary storage, a logical 1 into an unmasked bit location of a plurality of bit locations of the temporary storage in response to each of the first indications; and
storing, in the temporary storage, a logical 0 into the unmasked bit location of the plurality of bit locations in response to each of the second indications.

17. The method of claim 16, wherein:
generating the first indications comprises detecting, by the first circuitry, transition edges in the first data detection signal, and generating a store logical 1 signal with a first indication for each of the detected transition edges in the first data detection signal; and
generating the second indications comprises detecting, by the first circuitry, transition edges in the second data detection signal, and generating a store logical 0 signal with a second indication for each of the detected transition edges in the second data detection signal.

18. The method of claim 16, further comprising:
maintaining, by second circuitry, a write mask that indicates the unmasked bit location of the plurality of bit locations;
generating, by third circuitry, a trigger signal that includes a round-robin mask trigger for each of the first indications and the second indications; and
shifting, by the second circuitry, the write mask in response to the round-robin mask trigger, in order to indicate a different unmasked bit location of the plurality of bit locations.

19. The method of claim 16, further comprising:
tuning, by a tuning oscillator, the first and second oscillators simultaneously with data recovery processes implemented by the first and second oscillators.

20. The method of claim 16, further comprising:
providing, by second circuitry, a trigger signal indicating that data stored within the temporary storage is considered to be stable; and
initiating, by third circuitry, fetching of the data from the temporary storage when the third circuitry receives the trigger signal.

* * * * *